US012669482B2

(12) United States Patent
Sasaki et al.

(10) Patent No.: US 12,669,482 B2

(45) Date of Patent: Jun. 30, 2026

(54) FLEXOELECTRIC LIQUID CRYSTAL COMPOSITION, LIQUID CRYSTAL ELEMENT, LASER INSPECTION SYSTEM, AND METHOD FOR ANALYZING TEST SUBJECT

(71) Applicant: Tokyo University of Science Foundation, Tokyo (JP)

(72) Inventors: Takeo Sasaki, Tokyo (JP); Yumiko Naka, Tokyo (JP); Van Khoa Le, Tokyo (JP); Takaaki Yagami, Tokyo (JP); Yukihiro Ishii, Tokyo (JP)

(73) Assignee: Tokyo University of Science Foundation, Tokyo (JP)

(*) Notice: Subject to any disclaimer, the term of this patent is extended or adjusted under 35 U.S.C. 154(b) by 382 days.

(21) Appl. No.: 18/292,369

(22) PCT Filed: Jun. 21, 2022

(86) PCT No.: PCT/JP2022/024782

§ 371 (c)(1),
(2) Date: Jan. 26, 2024

(87) PCT Pub. No.: WO2023/007993

PCT Pub. Date: Feb. 2, 2023

(65) Prior Publication Data

US 2024/0345033 A1 Oct. 17, 2024

(30) Foreign Application Priority Data

Jul. 28, 2021 (JP) ................................ 2021-123643

(51) Int. Cl.

*G01N 29/24* (2006.01)
*C09K 19/02* (2006.01)
(Continued)

(52) U.S. Cl.

CPC ..... *G01N 29/2418* (2013.01); *C09K 19/0258* (2013.01); *C09K 19/3444* (2013.01);
(Continued)

(58) Field of Classification Search

CPC ................ C09K 19/58; C09K 19/0258; C09K 19/3444; C09K 19/3458; C09K 19/54;
(Continued)

(56) References Cited

U.S. PATENT DOCUMENTS 9,599,454 B2 * 3/2017 Yui .......................... G01J 9/04

FOREIGN PATENT DOCUMENTS

JP 2005-147813 A 6/2005
JP 2008216679 A * 9/2008
(Continued)

OTHER PUBLICATIONS

Zamiri, S., et al. "Employing 532 nm Wavelength in a Laser Ultrasound Interferometer Based on Photorefractive Polymer Composites." Open Access Library Journal, 2, e1247 (2015). DOI:10.4236/oalib.1101247.
(Continued)

*Primary Examiner* — Octavia Hollington
(74) *Attorney, Agent, or Firm* — Banner & Witcoff, Ltd.

(57) ABSTRACT

A flexoelectric liquid crystal composition containing at least one kind of smectic liquid crystal compound, a chiral dopant, and a charge scavenger, and exhibiting photoconductivity. By using the liquid crystal composition exhibiting a flexoelectric effect, a response speed of a photorefractive effect is excellent. Furthermore, the flexoelectric liquid crystal composition containing the smectic liquid crystal compound suppresses light scattering.

12 Claims, 10 Drawing Sheets

(51) Int. Cl.

| | |
|---|---|
| ***C09K 19/34*** | (2006.01) |
| ***C09K 19/54*** | (2006.01) |
| ***C09K 19/58*** | (2006.01) |
| ***G01N 29/04*** | (2006.01) |

(52) U.S. Cl.
CPC .......... *C09K 19/3458* (2013.01); *C09K 19/54* (2013.01); *C09K 19/588* (2013.01); *G01N 29/043* (2013.01); *G01N 2291/0234* (2013.01); *G01N 2291/0289* (2013.01)

(58) Field of Classification Search
CPC ................ C09K 19/586; C09K 19/588; G01N 29/2418; G01N 29/043; G01N 2291/0234; G01N 2291/0289; G01B 11/06; G02F 1/13781

See application file for complete search history.

(56) References Cited

FOREIGN PATENT DOCUMENTS

| | | | | |
|---|---|---|---|---|
| JP | 2009108233 | A | * | 5/2009 |
| JP | 2010038880 | A | * | 2/2010 |

OTHER PUBLICATIONS

Zamiri, S., et al. "Laser ultrasonic receivers based on organic photorefractive polymer composites" Appl. Phys. B (2014). 114:509?515 DOI 10.1007/s00340-013-5554-7.

Sasaki Takeo, Effect of chiral concentration of chiral smectic C liquid crystal mixture on the photorefractive property, Proceedings of SPIE, 2020.04.06, vol. 11367, 113670V-1-113670V-10, DOI: 10.1117/12.2554925 Abstract, 2.1 Samples, 3. Results and Discussions, Figures 2, 4-11.

Sasaki Takeo et al., Real-time dynamich hologram in photorefractive ferroelectric liquid crystal with two-beam coupling gain coefficient of over 800 cm-1 and response time of 8ms, Applied Physics Letters, Feb. 14, 2013, 102, 063306-1-063306-4.

* cited by examiner

FLEXOELECTRIC LIQUID CRYSTAL COMPOSITION, LIQUID CRYSTAL ELEMENT, LASER INSPECTION SYSTEM, AND METHOD FOR ANALYZING TEST SUBJECT

RELATED APPLICATIONS

This application is a National Stage Application under 35 U.S.C. 371 of co-pending PCT application PCT/JP2022/024782 designating the United States and filed Jun. 21, 2022, which claims the benefit of JP application number 2021-123643 and filed Jul. 28, 2021, each of which are hereby incorporated by reference in their entireties.

TECHNICAL FIELD

The present disclosure relates to a flexoelectric liquid crystal composition, a liquid crystal element, a laser inspection system, and a method of analyzing a test subject.

BACKGROUND ART

Examples of ultrasonic flaw detection include a method of performing non-destructive inspection. The ultrasonic flaw detection is widely used in various fields because it can detect properties and deterioration of materials. As a means for performing ultrasonic flaw detection, a method using a laser is known.

For example, Patent Document 1 proposes a laser ultrasonic inspection apparatus for nondestructively inspecting a defect or the like of an inspection object surface by irradiating the inspection object surface with a laser beam. The laser ultrasonic inspection apparatus described in Patent Document 1 includes a photorefractive crystal for receiving an irradiation laser beam and the reference laser beam and performing interference measurement, in which a bismuth silicon oxide (BSO) crystal that is an inorganic crystal is used as the photorefractive crystal.

Furthermore, Non Patent Document 1 and Non Patent Document 2 propose a laser ultrasonic inspection apparatus using a photorefractive material containing a polymer material instead of a photorefractive crystal.

CITATION LIST

Patent Document

Patent Document 1: Japanese Patent Application Laid-Open (JP-A) No. 2010-038880

Non Patent Document

Non Patent Document 1: Zamiri, S., et al. "Employing 532 nm Wavelength in a Laser Ultrasound Interferometer Based on Photorefractive Polymer Composites." Open Access Library Journal, 2, e1247 (2015). DOI:10.4236/oalib.1101247.

Non Patent Document 2: Zamiri, S., et al. "Laser ultrasonic receivers based on organic photorefractive polymer composites" Appl. Phys. B (2014). 114:509-515 DOI 10.1007/s00340-013-5554-7.

SUMMARY OF INVENTION

Technical Problem

A photorefractive effect is a phenomenon in which a refractive index grating (hologram) is formed in a medium exhibiting photoconductivity and an electro-optical effect when a laser beam is made to interfere in the medium. By using a photorefractive material exhibiting the photorefractive effect and an ultrasonic laser, it is possible to search for a defect inside an object and to measure a thickness of a plate-like object in a non-contact manner.

Specifically, the test subject is irradiated with a continuous oscillation laser, and reflected light thereof is incident on an element (hereinafter also referred to as a "photorefractive element") containing a photorefractive material and made to interfere with reference light to cause two-light wave coupling. The two-light wave coupling is caused by a phase shift between interference fringes and the refractive index grating. Thus, the reflected light transmitted through the photorefractive element and detected is amplified, and the reference light is attenuated, so that the intensities of the reflected light and the reference light approach a constant value. At this time, the test subject is irradiated with a pulse laser having a pulse width of nanoseconds or less, and an ultrasonic wave is generated on the test subject surface. The ultrasonic wave propagates inside the test subject and is reflected by each surface of the test subject and a defect, a structure, and the like inside the test subject. The reflected wave of the ultrasonic wave appears on the irradiation surface of the continuous oscillation laser, and thus the reflected light fluctuates. Thus, modulation occurs in the phase of the reflected light, so that the phase of the interference fringes in the photorefractive material also changes, and light intensities of the reflected light and the reference light due to the two-light wave coupling fluctuates. Accordingly, by measuring the time from when the test subject is irradiated with pulsed light to when the reflected light or the reference light changes, it is possible to obtain information regarding a thickness of the test subject, a defect, a structure, and the like inside the test subject.

In conventional ultrasonic flaw detection measurement using a photorefractive material and an ultrasonic laser, an inorganic crystal is used as the photorefractive material as in Patent Document 1, or a polymer is used as in Non Patent Document 1 and Non Patent Document 2. However, in a case where an inorganic crystal such as barium titanate or lithium niobate or polymer is used for the photorefractive element, there is a problem that a response speed of the photorefractive effect is slow.

In a case where the response of the photorefractive effect is slow, it is necessary to measure the photorefractive element in a quiet environment. The reason is that the refractive index grating is shifted due to vibration, and modulation occurs in the two-light wave coupling, so that ultrasonic flaw detection measurement cannot be performed. For example, the frequency of vibration under a normal environment caused by an automobile or the like is 0.1 Hz to several tens of Hz, which is close to the response time (several seconds to several tens of milliseconds) of the photorefractive effect of the inorganic crystal or polymer. Under a normal environment, ultrasonic flaw detection measurement is hindered. Thus, it is necessary to apply a voltage of about several kilovolts to the photorefractive element to increase the response speed or to use a large-scale device including a vibration isolator for ultrasonic flaw detection measurement. For example, in Non Patent Document 1, a voltage of 5 kV is applied to a photorefractive material including a polymer material. In this regard, Non Patent Document 2 describes that the response speed can be increased by increasing the voltage applied to the photorefractive element. However, the technique of Non Patent Document 2 merely describes that a response time of 195 milliseconds or 60 milliseconds is obtained by applying a voltage of 5 kV to the photorefractive material, and further improvement of the response speed is desirable.

The present disclosure has been made in view of the above circumstances, and an object thereof is to provide a flexoelectric liquid crystal composition excellent in response speed of a photorefractive effect, a liquid crystal element including the same and a laser inspection system, and a method of analyzing a test subject using the laser inspection system.

Solution to Problem

Means for solving the above problems include the following embodiments.

<1> A flexoelectric liquid crystal composition, comprising:
- at least one kind of smectic liquid crystal compound;
- a chiral dopant; and
- a charge scavenger,
- wherein the flexoelectric liquid crystal composition exhibits photoconductivity.

<2> The flexoelectric liquid crystal composition according to <1>, wherein the chiral dopant contains a photoconductive chiral dopant.

<3> The flexoelectric liquid crystal composition according to <2>, wherein the photoconductive chiral dopant contains at least one of a compound represented by a general formula (1) below or a compound represented by a general formula (2) below.

(1)

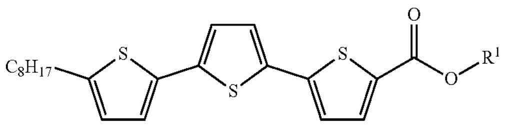

(2)

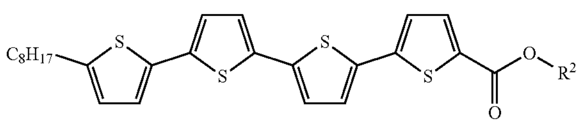

In the general formula (1) and the general formula (2) each of $R^1$ and $R^2$ is independently a hydrocarbon group having an asymmetric carbon.

<4> The flexoelectric liquid crystal composition according to <3>, wherein in the general formula (1) and the general formula (2), $R^1$ and $R^2$ are a 2-methylbutyl group.

<5> The flexoelectric liquid crystal composition according to any one of <1> to <4>, wherein the smectic liquid crystal compound contains a liquid crystal compound exhibiting a smectic C phase.

<6> The flexoelectric liquid crystal composition according to any one of <1> to <5>, wherein a content of the chiral dopant is 0.1 parts by mass to 10 parts by mass with respect to 100 parts by mass of a total amount of the smectic liquid crystal compound.

<7> A liquid crystal element, comprising:
- a liquid crystal film formed by the flexoelectric liquid crystal composition according to any one of <1> to <6>; and
- a pair of transparent substrates sandwiching the liquid crystal film.

<8> The liquid crystal element according to <7>, wherein the liquid crystal film has a thickness of 5 μm to 15 μm.

<9> A laser inspection system, comprising:
- a first laser emission unit that generates ultrasonic vibration on a surface of a test subject by irradiating the test subject with a pulse oscillation laser;
- a second laser emission unit that emits a continuous oscillation laser;
- a beam splitter that splits the continuous oscillation laser emitted from the second laser emission unit into irradiation light to be irradiated to the surface of the test subject and reference light;
- the liquid crystal element according to <7> or <8> that receives reflected light that is the irradiation light irradiated to the surface of the test subject and reflected from the test subject and the reference light, and causes the reflected light and the reference light to interfere with each other; and
- a detection unit that detects at least one of the irradiation light or the reference light emitted from the liquid crystal element.

<10> A laser inspection system, comprising:
- a first laser emission unit that generates ultrasonic vibration on a surface of a test subject by irradiating the test subject with a pulse oscillation laser;
- a second laser emission unit that emits a continuous oscillation laser;
- a beam splitter that splits the continuous oscillation laser emitted from the second laser emission unit into irradiation light to be irradiated to the surface of the test subject and reference light;
- a liquid crystal element that receives reflected light that is the irradiation light irradiated to the surface of the test subject and reflected from the test subject and the reference light, and causes the reflected light and the reference light to interfere with each other; and
- a detection unit that detects at least one of the irradiation light or the reference light emitted from the liquid crystal element,
- wherein the liquid crystal element includes a liquid crystal film formed by a ferroelectric liquid crystal composition and a pair of transparent substrates sandwiching the liquid crystal film.

<11> A method of analyzing a test subject for analyzing a property of the test subject using the laser inspection system according to <9> or <10>, the method comprising analyzing a property of the test subject on a basis of a change in intensity of light detected by the detection unit due to interference between the reflected light that is the irradiation light irradiated to a surface of the test subject where ultrasonic vibration is generated and reflected from the test subject and the reference light in the liquid crystal element.

Advantageous Effects of Invention

According to the present disclosure, it is possible to provide a flexoelectric liquid crystal composition excellent in response speed of a photorefractive effect, a liquid crystal element including the same and a laser inspection system, and a method of analyzing a test subject using the laser inspection system.

DESCRIPTION OF EMBODIMENTS

Figure 1:
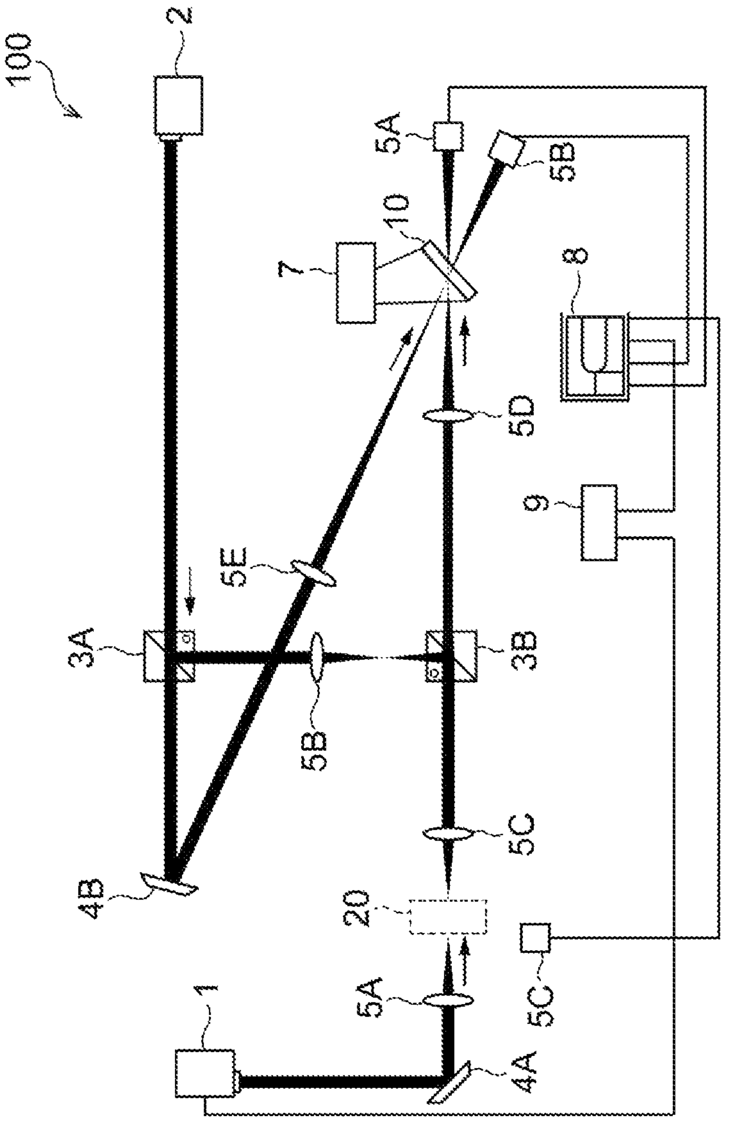
FIG. 1 is a schematic configuration diagram showing a laser inspection system according to an embodiment of the present disclosure.

In the present disclosure, a numerical range represented using "to" means a range including numerical values described before and after "to" as a lower limit value and an upper limit value.

In numerical ranges described in stages in the present disclosure, an upper limit value or a lower limit value described in one numerical range may be replaced with an upper limit value or a lower limit value of another numerical range described in stages. In a numerical range described in the present disclosure, an upper limit value or a lower limit value of the numerical range may be replaced with a value shown in Examples.

In the present disclosure, each component may contain a plurality of kinds of corresponding substances. In a case in which a plurality of substances corresponding to respective components is present in a composition, a content rate or content of each component means a total content rate or content of the plurality of kinds of substances present in the composition unless otherwise specified.

[Flexoelectric Liquid Crystal Composition]

A flexoelectric liquid crystal composition of the present disclosure contains at least one kind of smectic liquid crystal compound, a chiral dopant, and a charge scavenger, and exhibits photoconductivity. By using the liquid crystal composition exhibiting a flexoelectric effect, a response speed of a photorefractive effect is excellent. Furthermore, the flexoelectric liquid crystal composition containing the smectic liquid crystal compound suppresses light scattering.

The flexoelectric liquid crystal composition of the present disclosure is excellent in response speed of the photorefractive effect, and thus it is not necessary to increase the response speed by applying a high voltage to a liquid crystal element formed using the liquid crystal composition. Furthermore, data relating to amplification and attenuation of light intensity by two-light wave coupling can be acquired within a time faster than several tens of milliseconds in which vibration noise becomes a problem, for example, in microseconds to several tens of milliseconds, the liquid crystal element is hardly affected by vibration noise of 0.1 Hz to several tens of Hz. By using the liquid crystal element, properties of a thickness, an internal defect, a structure, and the like of the test subject can be measured even under a vibrating environment, and it is hardly affected by swinging of air. Thus, the vibration isolator is unnecessary, and the device for measuring the property of the test subject can be downsized. Furthermore, it is possible to perform a non-contact diagnosis of a test subject such as a steel frame or concrete by taking out the device for measuring the property of the test subject outdoors.

By using the liquid crystal element formed by using the flexoelectric liquid crystal composition of the present disclosure, it is also possible to measure the property of a greatly moving object. Thus, by using a near-infrared laser, it is also possible to probe the sub-skin tissue.

A mechanism by which the photorefractive effect is obtained and a property of the test subject can be measured by using the liquid crystal element formed using the flexoelectric liquid crystal composition of the present disclosure is as follows.

The flexoelectric liquid crystal composition includes a smectic liquid crystal compound and a chiral dopant exhibiting an electro-optical effect, a compound exhibiting photoconductivity, and a charge scavenger. As described later, the chiral dopant may be a photoconductive chiral dopant also serving as a compound exhibiting photoconductivity, and in this case, it is not necessary to separately add a compound exhibiting photoconductivity. When light is interfered in a liquid crystal film obtained from such a flexoelectric liquid crystal composition, a compound exhibiting photoconductivity in a bright portion of interference fringes absorbs light to generate positive and negative charges. Negative charges (electrons) are captured by the charge scavenger, while positive charges (holes) diffuse into the liquid crystal film. A bright portion of the interference fringes is negatively charged, and a dark portion is positively charged. As a result, an electric field (internal electric field) is generated by a potential difference between the bright portion and the dark portion. An electro-optical effect is generated by the internal electric field, the refractive index changes, and a refractive index grating is formed. Specifically, a polarization direction of the liquid crystal film is changed by an internal electric field, and lattice fringes in which liquid crystal alignment is periodically changed are formed, and these lattice fringes function as a refractive index grating. The refractive index grating occurs between the bright portion and the dark portion of the interference fringes.

The refractive index grating due to the photorefractive effect has a specific influence on transmission of an interfering laser beam. When the refractive index grating in which the phase is shifted from bright and dark phases of the interference fringes is formed, only one of the interfering beams is diffracted and the other is not diffracted, so that a transmission intensity of each laser beam changes in contrast. The transmission intensity of one of the two interfering laser beams is increased, and the transmission intensity of the other is attenuated. This phenomenon is referred to as photorefractive two-light wave coupling.

Since the photorefractive two-light wave coupling is caused by interference between two laser beams. If the phase of one of the laser beams is slightly shifted, the condition of two-light wave coupling is not satisfied, and a transmitted light intensity of the liquid crystal element changes. Therefore, phase modulation of light can be detected using this phenomenon.

For example, a continuous wave (CW) laser beam is divided into two beams, one of the beams is made incident on a liquid crystal element as reference light, the other beam is irradiated on an object as a test subject as irradiation light, and reflected light from the object is made incident on the liquid crystal element. The reference light and the reflected light are caused to interfere with each other, and an intensity at which each light is transmitted through the liquid crystal element is measured. The photorefractive two-light wave coupling occurs to amplify the reflected light and attenuate the reference light, both approaching a constant value.

Next, the object is irradiated with a pulse laser having a pulse width of nanoseconds or less, and an ultrasonic wave is generated on an object surface. The ultrasonic wave propagates inside the object and is reflected by each surface of the object and a defect, a structure, and the like inside the object. The reflected wave appearing on the object surface causes fluctuation in reflection of the irradiation light. When the reflection of the irradiation light fluctuates, the phase of the reflected wave of the irradiation light is modulated, so that the phase of the interference fringes in the liquid crystal film also changes. This causes a deviation from the condition of the two-light wave coupling, and thus, amplification and attenuation of light changes. By measuring time from when the object is irradiated with the pulsed laser beam until the irradiation light changes, it is possible to obtain information regarding properties of the object such as a thickness of the object and a defect, a structure, and the like inside the object.

Hereinafter, details of each component contained in the flexoelectric liquid crystal composition of the present disclosure will be described.

(Smectic Liquid Crystal Compound)

The flexoelectric liquid crystal composition (hereinafter also referred to as a "liquid crystal composition") of the present disclosure contains at least one kind of smectic liquid crystal compound. The smectic liquid crystal compound contained in the liquid crystal composition may be one kind alone or a mixture of two or more kinds.

The smectic liquid crystal compound is preferably a liquid crystal compound exhibiting a smectic C phase from the viewpoint of easily obtaining an alignment state with few defects, having high transparency, and suitably exhibiting a flexoelectric effect. The liquid crystal compound exhibiting a smectic C phase is one kind alone, or a mixture of two or more kinds.

Examples of the liquid crystal compound exhibiting a smectic C phase include a mesogenic compound having any of a phenylpyrimidine skeleton, a phenylpyridine skeleton, and a biphenyl skeleton. The liquid crystal compound exhibiting a smectic C phase preferably contains at least one of a 2-phenylpyrimidine derivative, a 2-phenylpyridine derivative, or a biphenyl ester derivative.

The 2-phenylpyrimidine derivative is preferably, for example, an alkoxy-substituted 2-phenylpyrimidine derivative, and more preferably a compound represented by the following chemical formula. The 2-phenylpyrimidine derivative may be one kind alone or a mixture of two or more kinds, and may be, for example, a mixture of compounds represented by the following chemical formula.

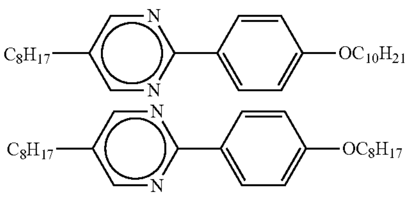

-continued

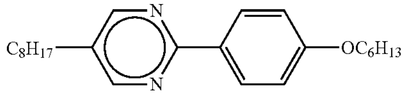

The 2-phenylpyridine derivative is preferably, for example, an alkoxy-substituted 2-phenylpyridine derivative, and more preferably a compound represented by the following chemical formula. The 2-phenylpyridine derivative may be one kind alone or a mixture of two or more kinds, and may be, for example, a mixture of compounds represented by the following chemical formula.

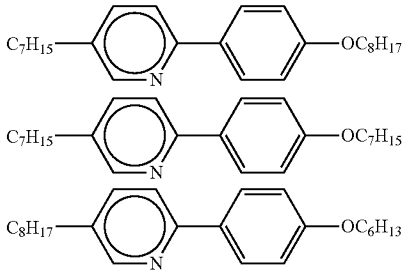

The biphenyl ester derivative is preferably, for example, a compound in which a biphenyl skeleton and a phenyl skeleton are bonded via an ester bond, and more preferably a compound represented by the following chemical formula. The biphenyl ester derivative may be one kind alone or a mixture of two or more kinds, and may be, for example, a mixture of two or more kinds of compounds represented by the following chemical formula.

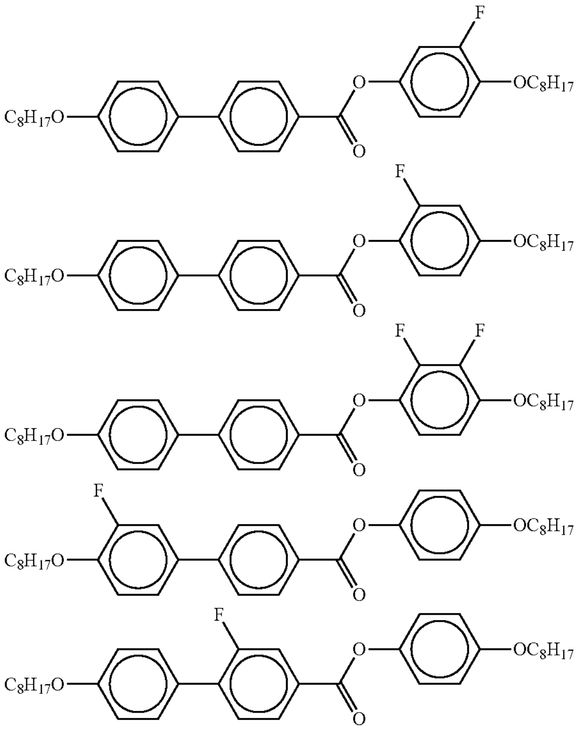

-continued

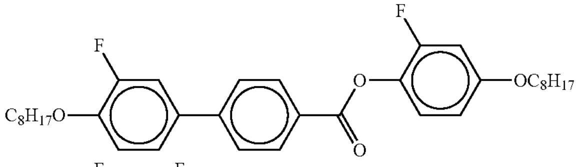

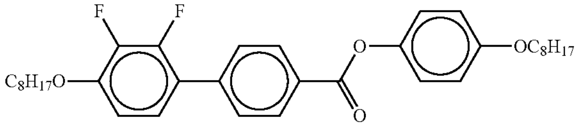

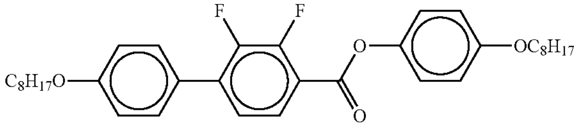

The liquid crystal composition of the present disclosure includes a chiral dopant. The chiral dopant is a compound having an asymmetric structure, and the smectic liquid crystal compound exhibits an excellent flexoelectric effect depending on the chiral site of the chiral dopant. By using the smectic liquid crystal compound, a photorefractive effect larger than that of a liquid crystal exhibiting ferroelectricity can be obtained.

The chiral dopant preferably includes a photoconductive chiral dopant. By using the photoconductive chiral dopant, photoconductivity can be developed in the liquid crystal composition without separately using a compound exhibiting photoconductivity. The photoconductive chiral dopant may be one kind alone or a mixture of two or more kinds.

The photoconductive chiral dopant preferably contains at least one of a compound represented by the following general formula (1) or a compound represented by the following general formula (2).

(1)

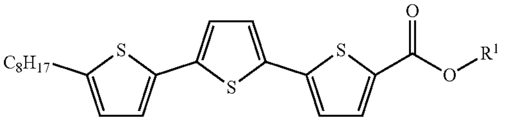

(2)

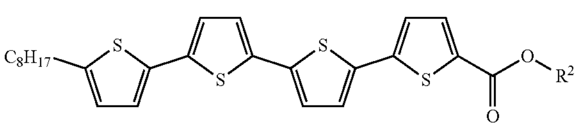

In the general formula (1) and the general formula (2), each of $R^1$ and $R^2$ is independently a hydrocarbon group having an asymmetric carbon.

$R^1$ and $R^2$ are each independently preferably an alkyl group having an asymmetric carbon, more preferably an alkyl group having an asymmetric carbon and having 4 to 10 carbon atoms, and still more preferably an alkyl group having an asymmetric carbon and having 5 to 8 carbon atoms. $R^1$ and $R^2$ are particularly preferably a 2-methylbutyl group from the viewpoint that the smectic liquid crystal compound suitably exhibits a flexoelectric effect. The compound in which $R^1$ and $R^2$ in the general formula (1) and the general formula (2) are a 2-methylbutyl group is represented by the following chemical formula.

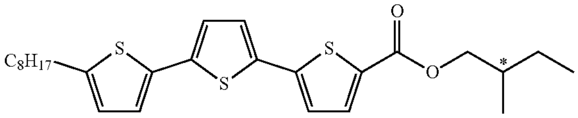

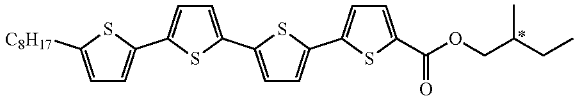

The content of the chiral dopant may be 0.1 parts by mass to 10 parts by mass or 0.1 parts by mass to 5 parts by mass with respect to 100 parts by mass of the total amount of the smectic liquid crystal compound.

In a case where a chiral dopant that is not photoconductive is used as the chiral dopant, the liquid crystal composition only needs to contain a compound exhibiting photoconductivity from the viewpoint of exhibiting photoconductivity in the liquid crystal composition.

Examples of the compound exhibiting photoconductivity include oligothiophene compounds such as terthiophene compounds and quatrothiophene compounds, tianocene compounds, carbazole compounds, and squaraine compounds. The compound exhibiting photoconductivity may be one kind alone or any mixture of two or more kinds.

Examples of the oligothiophene compounds include a compound represented by the following chemical formula.

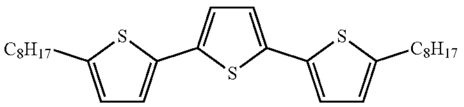

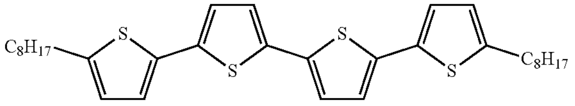

Examples of the tianocene compounds include a compound represented by the following chemical formula.

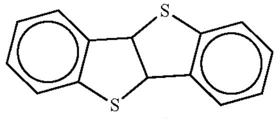

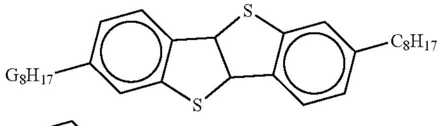

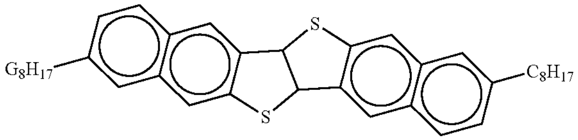

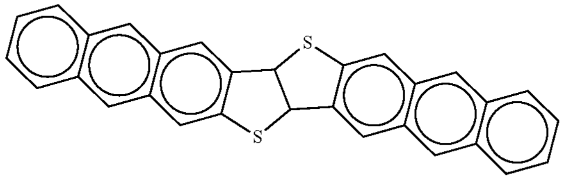

-continued

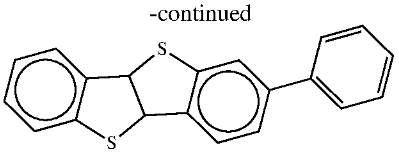

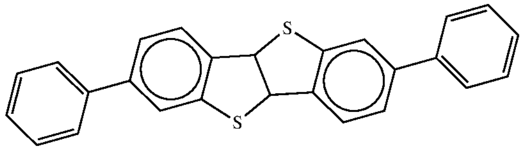

The carbazole compounds are more preferably a compound represented by the following chemical formula.

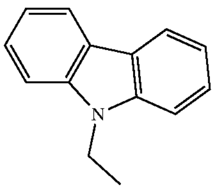

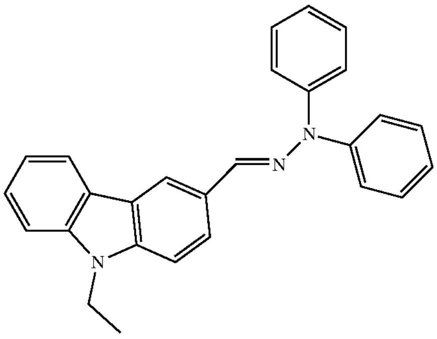

(Charge Scavenger)

The liquid crystal composition of the present disclosure includes a charge scavenger. The charge scavenger is added for capturing negative charges and lengthening an absorption light wavelength by charge transfer absorption. Examples of the charge scavenger include trinitrofluorenone (TNF), tetracyanoquinodimethane (TCNQ), and fullerene derivatives.

The content of the charge scavenger may be 0.1 parts by mass to 1 part by mass or 0.1 parts by mass to 0.3 parts by mass with respect to 100 parts by mass of the total amount of the smectic liquid crystal compound.

(Other Components)

The liquid crystal composition of the present disclosure may contain other components other than a smectic liquid crystal compound, a chiral dopant, a compound exhibiting photoconductivity, or the charge scavenger. The other components are not particularly limited as long as the effect of the liquid crystal composition of the present disclosure is exhibited, and examples thereof include a surfactant, a polymerization inhibitor, an antioxidant, and an ultraviolet absorber.

The liquid crystal composition of the present disclosure may or need not contain a liquid crystal compound other than the smectic liquid crystal compound. The content of the liquid crystal compound other than the smectic liquid crystal compound in the liquid crystal composition may be 10 parts by mass or less, 5 parts by mass or less, or 0 parts by mass with respect to 100 parts by mass of the smectic liquid crystal compound from the viewpoint of suppressing light scattering.

[Liquid Crystal Element]

A liquid crystal element of the present disclosure includes a liquid crystal film formed by the flexoelectric liquid crystal composition of the present disclosure, and a pair of transparent substrates sandwiching the liquid crystal film. By using the above-described flexoelectric liquid crystal composition for formation of a liquid crystal film, light scattering is suppressed, and a liquid crystal element excellent in response speed of the photorefractive effect can be obtained. By using the liquid crystal element and the ultrasonic laser, it is possible to measure properties of an internal defect, a structure, and the like of the test subject even under a vibration environment as described above.

A thickness of the liquid crystal film is preferably 5 μm to 15 μm, more preferably 6 μm to 13 μm, and still more preferably 8 μm to 12 μm. In a case where the thickness of the liquid crystal film is equal to or more than 5 μm, the refractive index grating tends to be suitably formed, and in a case where the thickness of the liquid crystal film is equal to or less than 15 μm, the smectic liquid crystal tends to be suitably arranged.

An area of a main surface of the liquid crystal film is preferably 0.5 $cm^2$ to 5 $cm^2$ and more preferably 0.5 $cm^2$ to 1 $cm^2$ from the viewpoint of suppressing alignment defects.

The liquid crystal film is sandwiched between a pair of transparent substrates.

The transparent substrates are not particularly limited, and can be appropriately selected. Examples of the transparent substrates include a glass substrate and a plastic substrate (for example, a polyethylene naphthalate (PEN) substrate, a polyethylene terephthalate (PET) substrate, a polycarbonate (PC) substrate, or a polyimide (PI) substrate). Thicknesses and shapes of the transparent substrates are not particularly limited as long as the transparent substrates can sandwich the liquid crystal film.

The pair of transparent substrates may include an alignment film on a surface on the liquid crystal film side, and the liquid crystal film may be sandwiched between the pair of transparent substrates via the alignment film.

A material of the alignment film is not particularly limited, and is similar to a conventionally known alignment film. Examples of the material of the alignment film include polyimide, polyvinyl alcohol, and polyester.

The alignment film may be subjected to rubbing treatment. The rubbing treatment can be performed by rubbing a surface of the alignment film in a certain direction with a rod, or a roller, which is wound with paper or cloth, or the like. As an example, in a case where the alignment film is a polyimide film, a polyimide solution may be applied onto a transparent substrate with a transparent electrode (for example, a glass substrate with a transparent electrode) by spin coating and dried, and rubbing treatment may be performed by a roller on which a velvet cloth is wound on the surface to which the polyimide is applied. Rubbing strength at a time of performing the rubbing treatment is expressed by the following formula.

$$R_s = NM\left(1 + \frac{2\pi rn}{60V}\right) \quad \text{[Math. 1]}$$

where $R_s$ is rubbing strength (mm), N is the number of times of rubbing, M is a length (mm) of a portion where the rubbing cloth and the substrate are in contact with each other, r is a radius (mm) of the rubbing cloth roll, n is a rotation speed (rpm: times/min) of the roller, and V is a moving speed ($mm \cdot s^{-1}$) of the alignment film coated substrate. The rubbing strength is preferably 200 mm to 250 mm. Thus, an alignment layer having less alignment defects and high transparency tends to be formed.

From the viewpoint of promoting positive and negative charge separation by light irradiation, a transparent electrode may be provided on each of the pair of transparent substrates, and a transparent electrode may be provided on each of surfaces of the pair of transparent substrates on the liquid crystal film side. In a case where the pair of transparent substrates includes an alignment film, a transparent electrode may be provided between the transparent electrodes and the alignment film.

The liquid crystal film is formed by applying the above-described liquid crystal composition on one of the transparent substrates, preferably on the alignment film of one of the transparent electrodes, and sandwiching the applied liquid crystal composition with the other of the transparent substrates. Examples of a method of applying the liquid crystal material to the transparent substrate include a coating method such as a spin coating method or a spraying method, an inkjet method, and a screen printing method. The liquid crystal composition applied on the transparent substrate may be subjected to a drying treatment as necessary.

As an example, two transparent substrates with a transparent electrode (for example, glass substrates with a transparent electrode) subjected to rubbing treatment may be bonded to each other with a 10 μm glass bead spacer or the like interposed therebetween to form a liquid crystal element having a liquid crystal film. It is preferable that the pair of transparent substrates is bonded so that rubbing directions are opposite to each other, that is, anti-parallel alignment.

[Laser Inspection System]

A laser inspection system according to the present disclosure includes a first laser emission unit that generates ultrasonic vibration on a surface of a test subject by irradiating the test subject with a pulse oscillation laser, a second laser emission unit that emits a continuous oscillation laser, a beam splitter that splits the continuous oscillation laser emitted from the second laser emission unit into irradiation light to be irradiated to the surface of the test subject and reference light, the liquid crystal element according to the present disclosure that receives reflected light that is the irradiation light irradiated to the surface of the test subject and reflected from the test subject and the reference light, and causes the reflected light and the reference light to interfere with each other, and a detection unit that detects at least one of the irradiation light or the reference light emitted from the liquid crystal element.

In the laser inspection system of the present disclosure, a liquid crystal element including a liquid crystal film formed by a ferroelectric liquid crystal composition may be used instead of the above-described liquid crystal element including the liquid crystal film formed by the flexoelectric liquid crystal composition. Even in a case where the liquid crystal element including a liquid crystal film formed by a ferroelectric liquid crystal composition is used, the photorefractive effect can be obtained, and a laser inspection system excellent in response speed can be obtained. In this regard, from the viewpoint of suitably suppressing light scattering, it is preferable to use the above-described liquid crystal element including a liquid crystal film formed by a flexoelectric liquid crystal composition and a laser inspection system including the liquid crystal element.

The ferroelectric liquid crystal composition is not particularly limited, and examples thereof include a conventionally known liquid crystal composition exhibiting ferroelectricity. For example, the ferroelectric liquid crystal material described in Japanese Patent Application Laid-Open (JP-A) No. 2008-216679, the ferroelectric liquid crystal composition described in Japanese Patent Application Laid-Open (JP-A) No. 2009-108233, or other known ferroelectric liquid crystal materials or ferroelectric liquid crystal compositions may be used.

[Method of Inspecting Test Subject]

A method of inspecting a test subject of the present disclosure is a method of analyzing a test subject for analyzing a property of the test subject using the laser inspection system of the present disclosure (including a case of using the liquid crystal element including a liquid crystal film formed by a ferroelectric liquid crystal composition), the method including analyzing a property of the test subject on the basis of a change in intensity of light detected by the detection unit due to interference between the reflected light that is the irradiation light irradiated to a surface of the test subject where ultrasonic vibration is generated and reflected from the test subject and the reference light in the liquid crystal element.

In the laser inspection system and the method of inspecting a test subject of the present disclosure, since the liquid crystal element of the present disclosure described above is used, properties of an internal defect, a structure, and the like of the test subject can be measured even under a vibration environment as described above. Hereinafter, an embodiment of the laser inspection system of the present disclosure and the method of inspecting a test subject using the same will be described. The laser inspection system of the present disclosure is not limited to the following specific configuration, and the method of inspecting a test subject of the present disclosure is not limited to the following method.

FIG. 1 shows a laser inspection system according to an embodiment of the present disclosure. The laser inspection system 100 shown in FIG. 1 includes a first laser emission unit 1, a second laser emission unit 2, beam splitters 3A and 3B, mirrors 4A and 4B, condenser lenses 5A to 5E, detectors 6A to 6C, a voltage application unit 7, a display unit 8, a control unit 9, and a liquid crystal element 10. Then, a test subject is arranged in a region 20 indicated by a dotted line in FIG. 1.

The first laser emission unit 1 is a laser irradiation device that emits a pulse oscillation laser toward the test subject. A pulse oscillation laser emitted by the first laser emission unit 1 is reflected by the mirror 4A, and a reflected pulse oscillation laser is condensed by the condenser lens 5A and then irradiated to a surface (for example, a back surface) of the test subject arranged in the region 20. By irradiating the pulse oscillation laser to the surface of the test subject, ultrasonic vibration is generated on the surface of the test subject.

A wavelength of the pulse oscillation laser emitted from the first laser emission unit 1 is preferably in an infrared range to a visible light range, and is only required to be appropriately selected according to the test subject. As the first laser emission unit 1, it is sufficient if, for example, a nanosecond Q-switched pulse laser is used.

The second laser emission unit 2 is a laser irradiation device that emits a continuous oscillation laser. The continuous oscillation laser emitted from the second laser emission unit 2 is divided into irradiation light to be irradiated to the surface of the test subject and reference light by the beam splitter 3A. The irradiation light divided by the beam splitter 3A passes through the condenser lens 5B, the beam splitter 3B, and the condenser lens 5C in this order, and is irradiated to the surface (for example, the front surface) of the test subject arranged in the region 20. At this time, the surface of the test subject irradiated with the pulse oscillation laser and the surface of the test subject irradiated with the irradiation light face each other, and an irradiation region of the irradiation light on the test subject is located on an extension line of an irradiation position of the pulse oscillation laser.

A wavelength of the continuous oscillation laser emitted from the second laser emission unit 2 is preferably in an ultraviolet region to the visible light region, and is only required to be appropriately selected according to the test subject, the compound exhibiting photoconductivity, an absorption wavelength region of the photoconductive chiral dopant, or the like. From the viewpoint of suitably forming interference fringes by reflected light from the test subject, it is preferable to select a continuous oscillation laser having a coherent length (coherence length) of 1 cm or more.

The irradiation light irradiated to the surface of the test subject and reflected from the test subject passes through the condenser lens 5C, the beam splitter 3B, and the condenser lens 5D in this order as reflected light, and is irradiated to the liquid crystal film 12 of the liquid crystal element 10.

The reference light divided by the beam splitter 3A is reflected by the mirror 4B, condensed by the condenser lens 5B, and then irradiated to the liquid crystal film 12 of the liquid crystal element 10.

Figure 2:
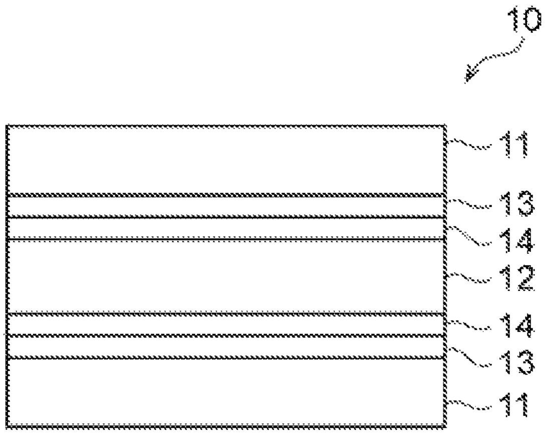
FIG. 2 is a schematic configuration diagram showing a liquid crystal element according to the embodiment of the present disclosure.

As shown in FIG. 2, the liquid crystal element 10 includes a pair of transparent substrates 11 and the liquid crystal film 12 sandwiched between the pair of transparent substrates. An ITO transparent electrode 13 and an alignment film 14 are provided between the transparent substrate 11 and the liquid crystal film 12 in order from the transparent substrate 11 side. The ITO transparent electrode 13 is electrically connected to the voltage application unit 7, and an electric field is formed in the liquid crystal film 12 when a voltage is applied to the ITO transparent electrode 13. From the viewpoint of promoting positive and negative charge separation by light irradiation, a voltage is preferably applied so that an electric field of about several V/μm is formed in the liquid crystal film 12.

The liquid crystal film 12 in the liquid crystal element 10 receives the reflected light and the reference light, and causes the reflected light and the reference light to interfere with each other. Thus, a refractive index grating having a phase shifted from bright and dark phases of the interference fringes is formed, the reflected light is amplified by photorefractive two-light wave coupling, and the reference light is attenuated.

The light absorption transition moment of the photoconductive chiral dopant in the liquid crystal film is in a molecular major axis direction and the photoconductive chiral dopant is aligned in the same direction as the smectic liquid crystal, and thus, it is preferable to increase light absorption efficiency by making the polarization of the laser and the alignment direction of the smectic liquid crystal substantially parallel.

The detectors 6A and 6B detect irradiation light and reference light emitted from the liquid crystal element 10. Light intensities of the irradiation light and the reference light detected by the detectors 6A and 6B are output by the display unit 8.

After the light intensities of the irradiation light and the reference light output from the display unit 8 approach constant values, the control unit 9 controls the first laser emission unit 1 to emit a pulse oscillation laser from the first laser emission unit 1 toward the test subject. The emitted pulse oscillation laser is irradiated to the test subject surface. The detector 6C detects the irradiation timing of the pulse laser, and the detected irradiation timing is output by the display unit 8. The pulse oscillation laser irradiated to the test subject surface generates an ultrasonic wave on the test subject surface, so that the ultrasonic wave propagates inside the test subject and is reflected by each surface of the test subject and a defect, a structure, and the like inside the test subject. The reflected wave appearing on the test subject surface causes fluctuation in reflection of the irradiation light. Thus, since the phase of the reflected wave of the irradiation light is modulated as described above, the phase of the interference fringes in the liquid crystal film 12 also changes, and as a result, the amplification and attenuation of the light changes. By measuring the time from when the test subject is irradiated with the pulse oscillation laser until the irradiation light changes, it is possible to obtain information regarding properties of the test subject such as a thickness of the test subject and a defect, a structure, and the like inside the test subject.

Furthermore, the irradiation position of the pulse oscillation laser and the irradiation area of the irradiation light based on the continuous oscillation laser in the test subject may be changed to obtain information regarding properties of the test subject such as a thickness of the test subject and a defect, a structure, and the like inside the test subject at a plurality of locations. For example, a structure of a test subject, a structure of a defect, and the like can be grasped by obtaining information regarding a thickness of the test subject or a defect inside the test subject at a plurality of locations.

The laser inspection system of the present disclosure does not need to include all the members, devices, and the like of the configuration shown in FIG. 1, and may include members, devices, and the like other than those of the configuration shown in FIG. 1. For example, the laser inspection system of the present disclosure may include optical members other than those of the configuration shown in FIG. 1, and may include an ND filter, a wave plate, a ¼ wave plate, a half wave plate, a polarizing plate, a filter, a lens other than a condenser lens, and the like.

Figure 3:
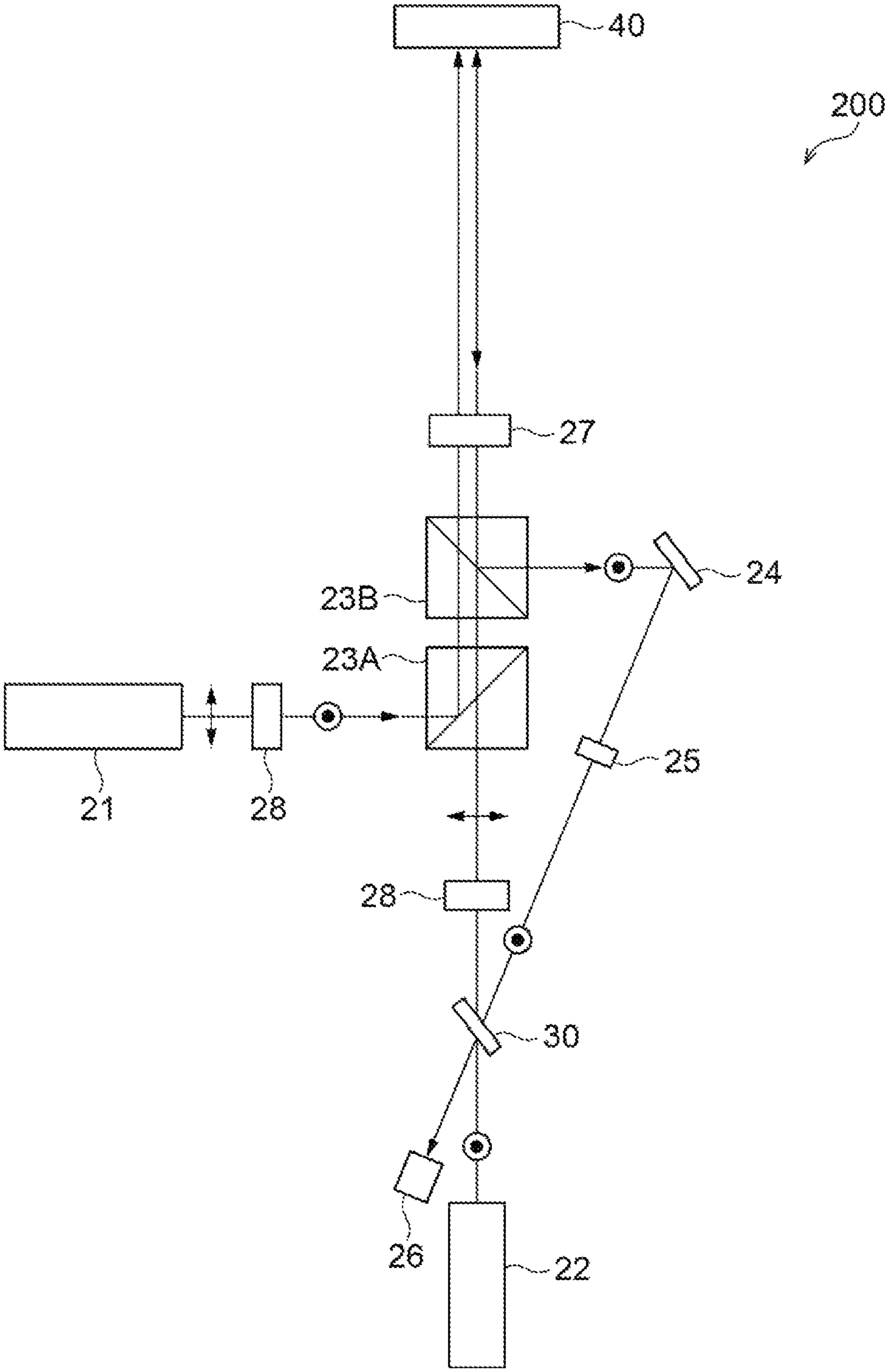
FIG. 3 is a schematic configuration diagram showing a laser inspection system according to another embodiment (first embodiment) of the present disclosure.

The laser inspection system of the present disclosure is not limited to the configuration in which the test subject is arranged in the laser inspection system, and may be, for example, a system in which a structure such as a tunnel or a bridge is set as a test subject and properties of the test subject such as a defect, a structure, and the like inside the test subject is inspected. For example, by configuring the laser inspection system of the present disclosure as shown in FIG. 3, it is possible to irradiate a test subject with the pulse oscillation laser and the continuous oscillation laser coaxially from the same direction, and analyze properties of the test subject. With this configuration, it is possible to perform thickness measurement of a steel frame or the like at a distant place, or internal flaw detection of a tunnel, a bridge, or the like in a non-contact manner. Furthermore, in a state where the laser inspection system of the present disclosure is mounted on a vehicle body, a moving device, or the like, properties of a test subject can be inspected while moving the vehicle body, the moving device, or the like.

(Laser Inspection System of First Embodiment)

The laser inspection system 200 shown in FIG. 3 includes a first laser emission unit 21, a second laser emission unit 22, beam splitters 23A and 23B, a mirror 24, a filter 25, a detector 26, a ¼ wave plate 27, half wave plates 28A and 28B, and a liquid crystal element 30. Then, the test subject 40 is irradiated with a pulse oscillation laser emitted from the first laser emission unit 21 and a continuous oscillation laser emitted from the second laser emission unit 22 coaxially from the same direction. In the present disclosure, a circled bullet in the drawing represents longitudinally polarized light, and double arrows represent laterally polarized light.

The laser inspection system 200 includes only the detector 26 that detects the reference light emitted from liquid crystal element 30, but may include a detector that detects the reflected light emitted from liquid crystal element 30. The laser inspection system 200 may include a member, a device, and the like other than the configuration shown in FIG. 3.

(Laser Inspection System of Second Embodiment)

Figure 9:
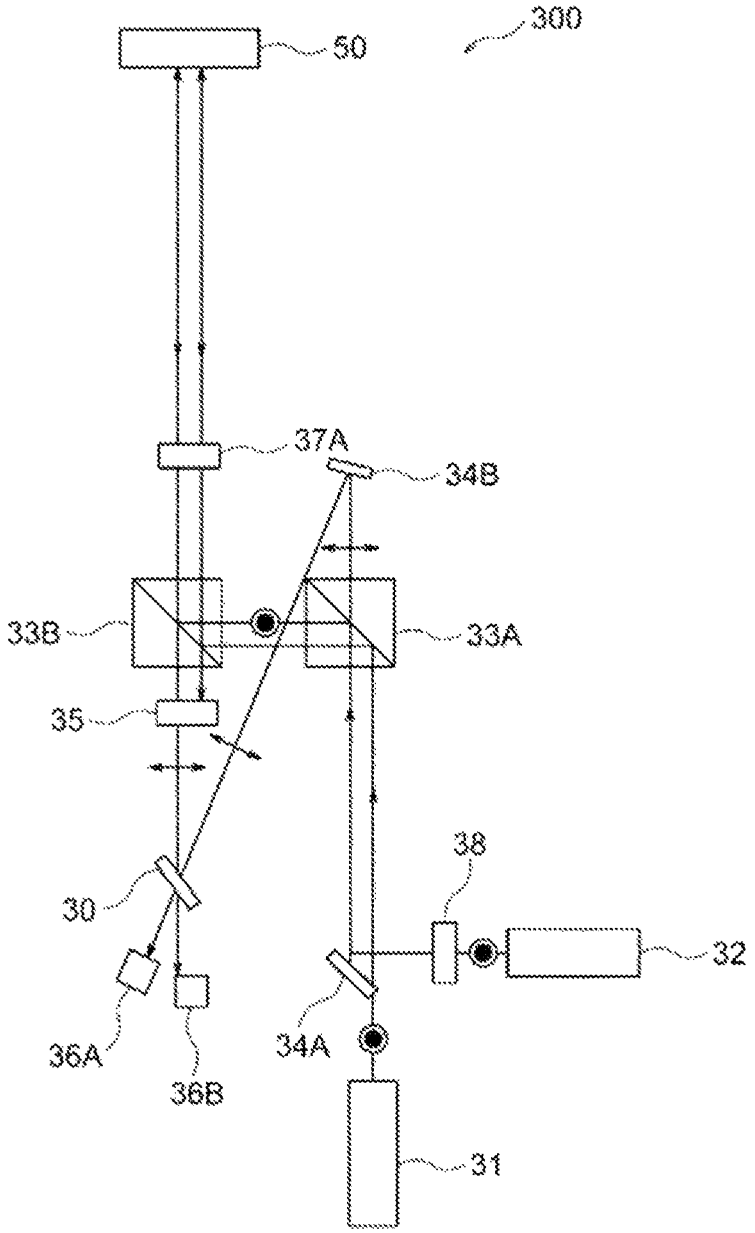
FIG. 9 is a schematic configuration diagram showing a laser inspection system according to another embodiment (second embodiment) of the present disclosure.

The laser inspection system 300 shown in FIG. 9 includes a liquid crystal element 30, a first laser emission unit 31, a second laser emission unit 32, beam splitters 33A and 33B, a dichroic mirror 34A and a mirror 34B, a filter 35, detectors 36A and 36B, and a ¼ wave plate 37A.

In the laser inspection system 200 of the first embodiment, a non-polarizing beam splitter needs to be used as the beam splitter 23B. The laser intensity is halved when the continuous oscillation laser is transmitted through the beam splitter 23B, and the laser intensity is further halved (¼ in total) when the reflected light reflected by the test subject 50 is separated by the beam splitter 23B.

In this regard, in the laser inspection system 300 of a second embodiment, polarizing beam splitters are used as the beam splitters 33A and 33B, and the dichroic mirror 34A that reflects light of a specific wavelength and transmits light of other wavelengths is used.

In the second embodiment, the continuous oscillation laser reflected by the dichroic mirror 34A is irradiated to the beam splitters 33A and 33B. The continuous oscillation laser is split by the beam splitter 33A into lasers of longitudinally polarized light and laterally polarized light, and the beam splitter 33B reflects the laser of the longitudinally polarized light toward the test subject 50 side. The laser of the longitudinally polarized light reflected toward the test subject 50 side passes through the ¼ wave plate 37A and is reflected by the test subject 50, and then passes through the ¼ wave plate 37A again. The reflected light reflected by the test subject 50 and transmitted through the ¼ wave plate 37A has become laterally polarized light, and the reflected light of the laterally polarized light is transmitted through the beam splitter 33B and irradiated to the liquid crystal element 30. The liquid crystal element 30 is also irradiated with the laser of the laterally polarized light split by the beam splitter 33A as reference light. The reflected light and the reference light transmitted through the liquid crystal element 30 are detected by the detectors 36A and 36B, respectively. By using the beam splitters 33A and 33B which are polarizing beam splitters, the intensity loss of the continuous oscillation laser when the laser is transmitted and reflected by the beam splitters is suppressed. As a result, the intensity of the continuous oscillation laser necessary for highly accurate detection can be reduced.

EXAMPLES

Hereinafter, the present invention will be described with reference to Examples, but the present invention is not limited to these Examples. In the following description, "%" is all on a mass basis unless otherwise specified.

Example 1

[Preparation of Liquid Crystal Composition]

A three-kind liquid crystal mixture of 2-phenylpyrimidine derivatives represented by the following chemical formula was used as a liquid crystal compound showing a smectic C phase, a compound having a terthiophene skeleton represented by the following chemical formula was used as a photoconductive chiral dopant, and trinitrofluorenone represented by the following chemical formula was used as a charge scavenger. The liquid crystal compound, the photoconductive chiral dopant, and the charge scavenger were mixed at the following mixing ratios to prepare a liquid crystal composition.

Liquid crystal compound: 100 parts by mass

Photoconductive chiral dopant: 5 parts by mass

Charge scavenger: 0.1 parts by mass

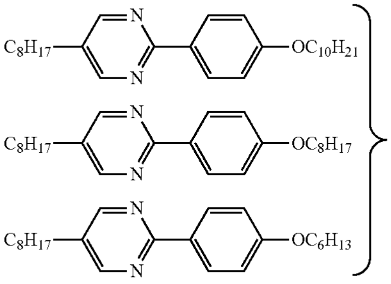

Liquid crystal mixture

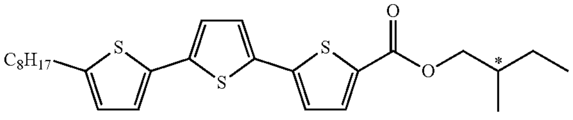

Photoconductive chiral dye

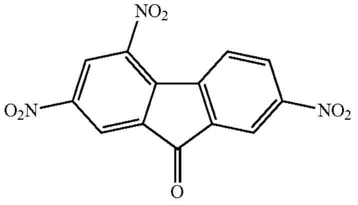

Charge scavenger

Liquid crystal mixture

Photoconductive chiral dye

Charge scavenger

[Production of liquid Crystal Element]

On a transparent substrate on which an ITO (indium tin oxide) transparent electrode was formed, a polyimide was applied to a surface on which the transparent electrode was formed, and rubbing treatment was performed under the condition of rubbing strength of 200 mm to 250 mm to form an alignment film. The liquid crystal composition was applied to the surface of the transparent substrate on which the alignment film was formed, and the liquid crystal composition was sandwiched between a pair of transparent substrates so that the surface on which the alignment film was formed was located on the liquid crystal composition side, thereby producing a liquid crystal element including a liquid crystal film. The thickness of the liquid crystal film was 10 km.

[Preparation of Laser Inspection System]

Using the liquid crystal element produced as described above, a laser inspection system as shown in FIG. 4 was prepared. As will be described later, a test subject was disposed in a dotted line portion in FIG. 4, and a thickness of the test subject was measured.

[Measurement of Thickness of Test Subject]

Figure 4:
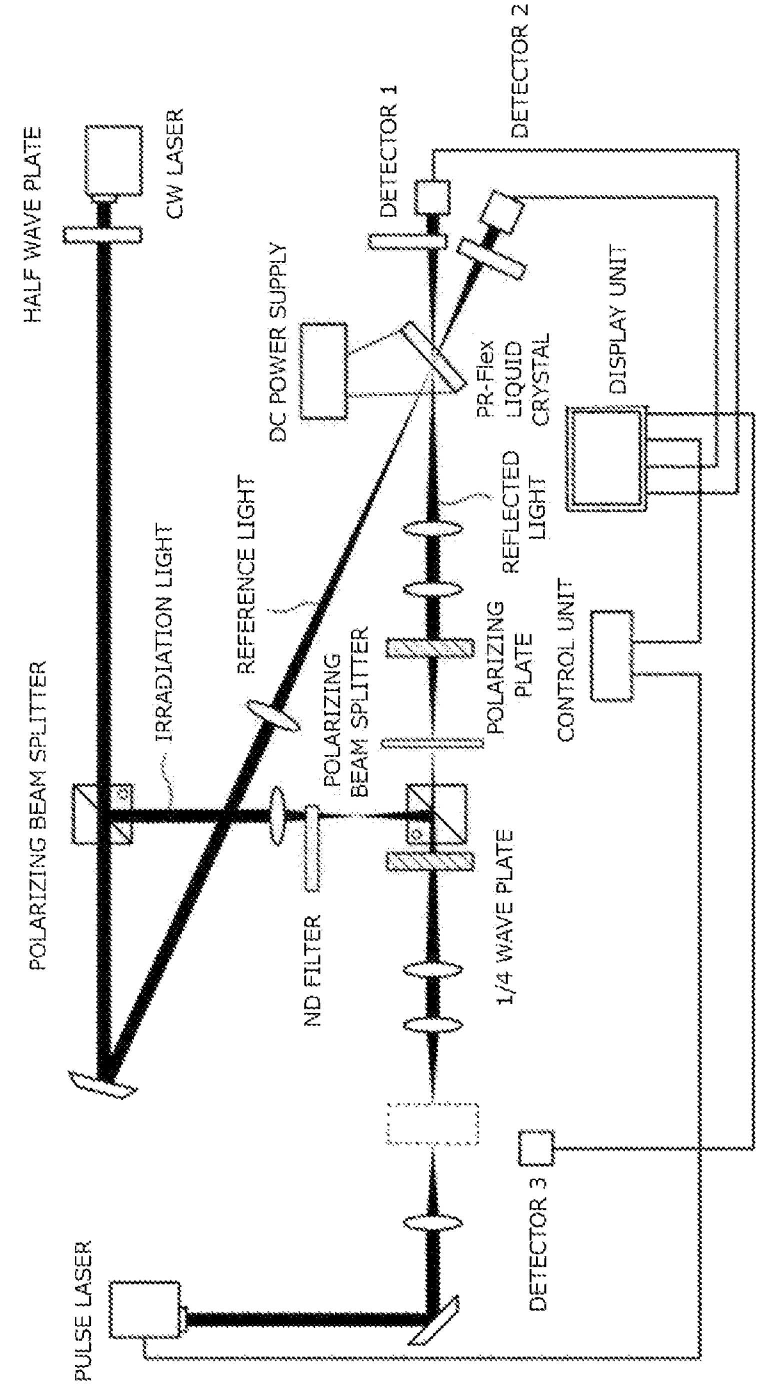
FIG. 4 is a schematic configuration diagram showing a laser inspection system used in Example 1.

A flat aluminum plate as a test subject was disposed in the dotted line portion in FIG. 4, and a thickness of the aluminum plate was measured. Light having a wavelength of 473 nm was output from the CW laser and was separated by a polarizing beam splitter into irradiation light to be irradiated to the aluminum plate and reference light, a front surface of the aluminum plate was irradiated with the irradiation light having a wavelength of 473 nm, and reflected light thereof is caused to interfere with the reference light in a liquid crystal film. A transmitted light intensity of the reflected light and a transmitted light intensity of the reference light at this time were detected by the detector 1 and the detector 2, and confirmed on the display unit. A voltage applied to the liquid crystal film by the DC power supply was equal to or less than 20 V, and an electric field applied to the liquid crystal film was 2 V/km.

Next, a back surface of the aluminum plate was irradiated with a nanosecond pulse laser having a wavelength of 1064 nm, and changes occurring in the irradiation light or the reference light were examined. The irradiation timing of the pulse laser was detected by the detector 3 and confirmed on the display unit. For the aluminum plate, the irradiation position of the irradiation light and the irradiation position of the pulse laser were accurately recorded.

Figure 5A:
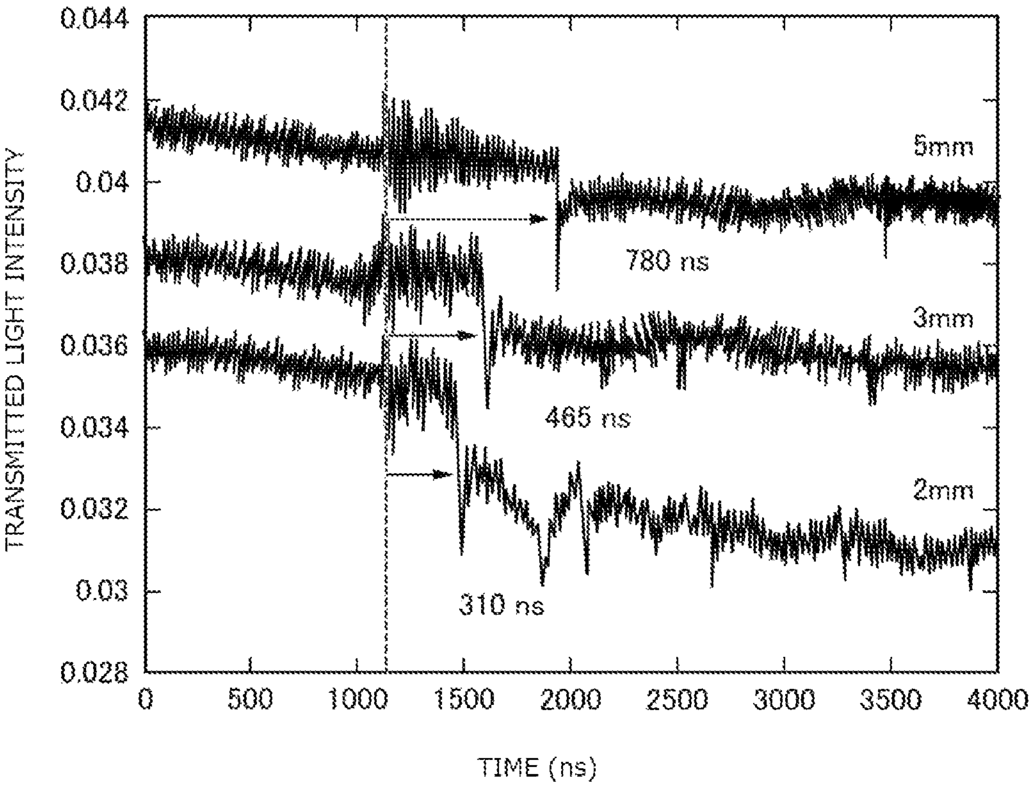
FIG. 5 is a graph showing a change in transmitted light intensity in a case where an aluminum plate having a thickness of 2 mm, 3 mm, or 5 mm is used as a test subject.
Figure 5B:
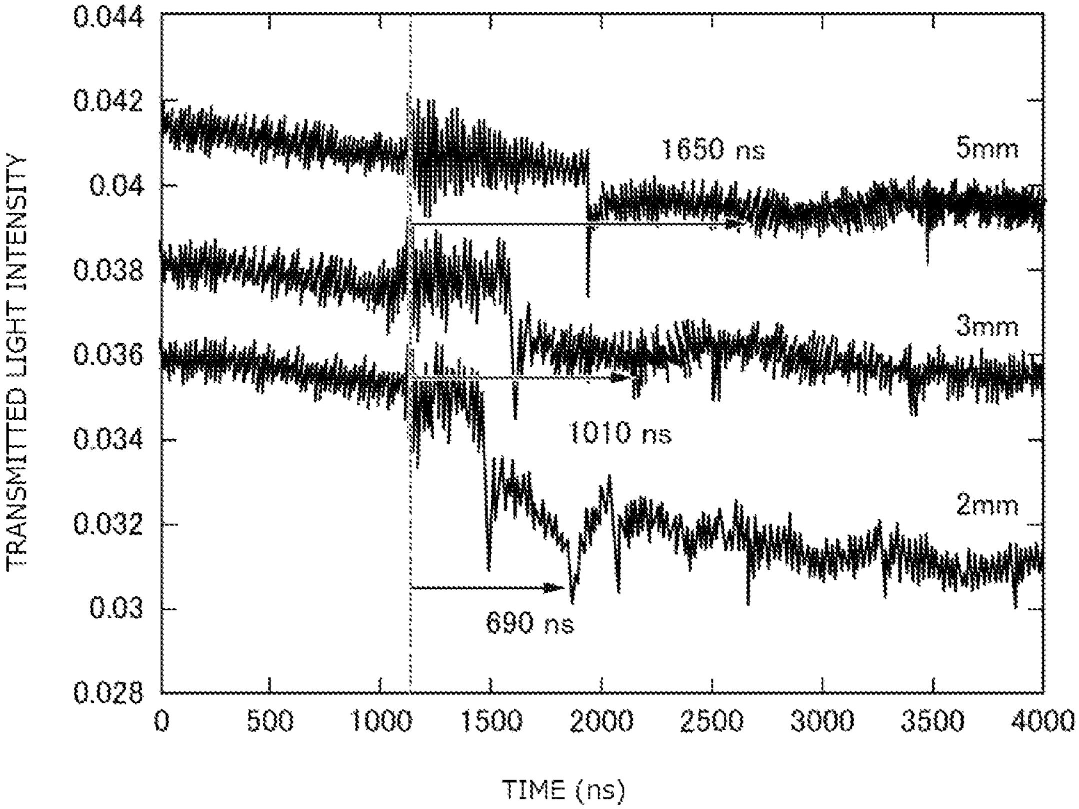

In ultrasonic vibration generated on a surface of the aluminum plate by irradiation of the pulse laser includes a longitudinal wave and a lateral wave. A transmission speed of the longitudinal wave is 6420 m/s and a transmission speed of the lateral wave is 3040 m/s in the aluminum plate. As the ultrasonic vibration is transmitted from the back surface to the front surface, the reflection of the irradiation light fluctuates. A distance between surfaces, that is, a thickness of the aluminum plate can be measured by measuring a time from pulse laser irradiation until reflection of the irradiation light changes. FIG. 5 shows an intensity change of the transmitted light intensity of the reference light in a case where an aluminum plate having a thickness of 2 mm, 3 mm, or 5 mm is used as a test subject. An arrow in FIG. 5A means a longitudinal wave arrival time in the aluminum plate of each thickness, and an arrow in FIG. 5B means a lateral wave arrival time in the aluminum plate of each thickness. Table 1 shows results of obtaining a thickness of the aluminum plate from the longitudinal wave arrival time and the lateral wave arrival time, and the transmission speed of the longitudinal wave and the transmission speed of the lateral wave.

TABLE 1

| Thickness of aluminum (mm) | Measurement value (mm) using longitudinal wave | Measurement value (mm) using lateral wave |
|---|---|---|
| 2 | 1.99 mm | 2.09 mm |
| 3 | 2.99 mm | 3.07 mm |
| 5 | 5.01 mm | 5.02 mm |

Figure 6:
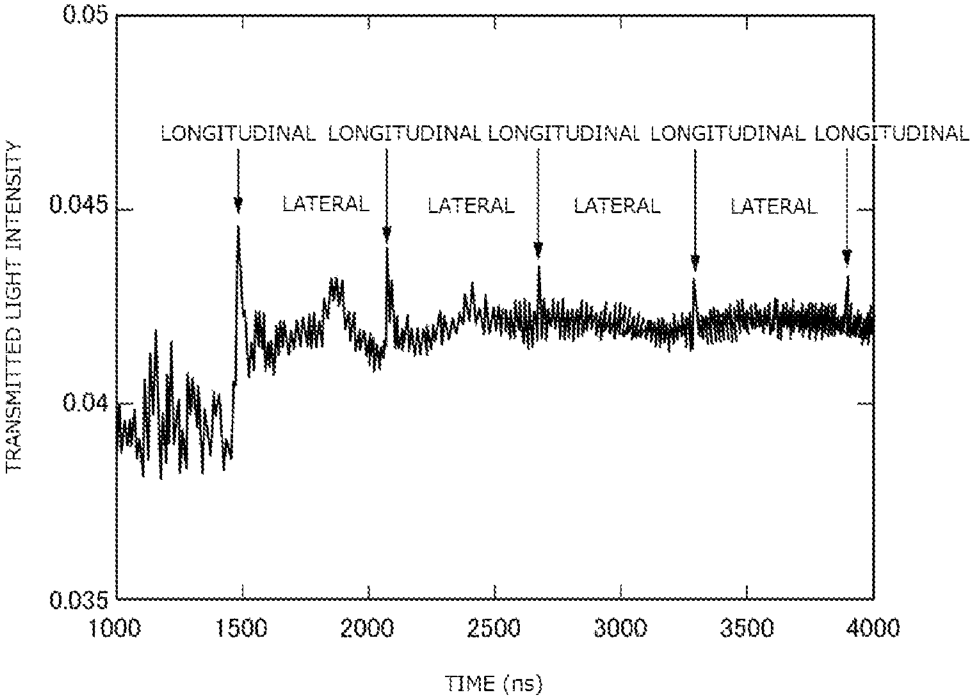
FIG. 6 is a graph showing a relationship between longitudinal waves and lateral waves and a change in transmitted light intensity in ultrasonic vibration.

As shown in Table 1, a measurement value using the longitudinal wave and a measurement value using the lateral wave accurately correspond to the thickness of the aluminum plate, and it was confirmed that the thickness of the test subject can be measured by the method of this example. A large number of signals are seen in the measurement result, and for example, as shown in FIG. 6, these are obtained by detecting ultrasonic vibration such that ultrasonic vibration is reflected by the front surface and the back surface of the aluminum plate.

As described in Non Patent Document 1 and Non Patent Document 2, in a case where a polymer material is used as a photorefractive material, it is necessary to measure a thickness of a test subject by applying a high voltage of about 5 kV to the photorefractive material. In this regard, in a case where a liquid crystal film was formed using a flexoelectric liquid crystal composition as in the present Example, the thickness of the test subject could be measured with high accuracy by applying a low voltage equal to or less than 20 V to the liquid crystal film. Furthermore, in the present example, even in a case where the low voltage as described above was applied to the liquid crystal film, a high response speed could be secured.

Example 2

Figure 7:
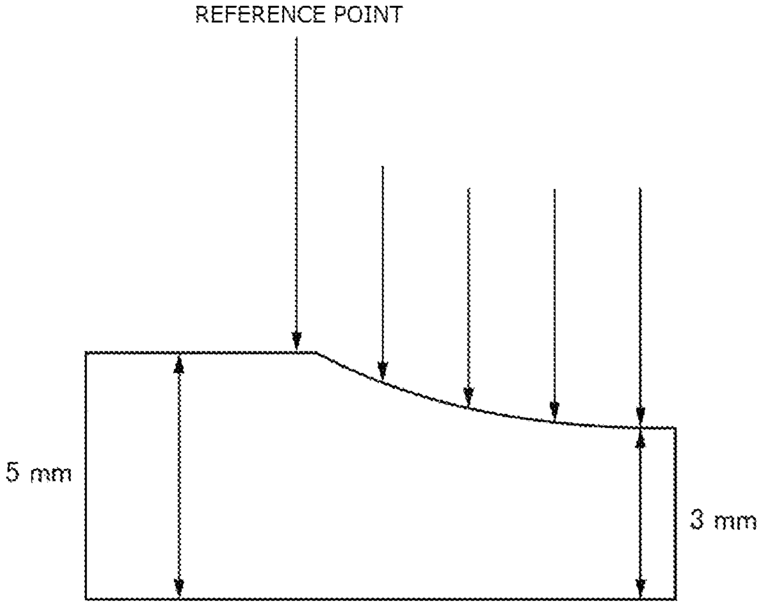
FIG. 7 is a graph showing a relationship between a measurement position of an aluminum plate and a temporal change in transmitted light intensity of reflected light.
Figure 8:
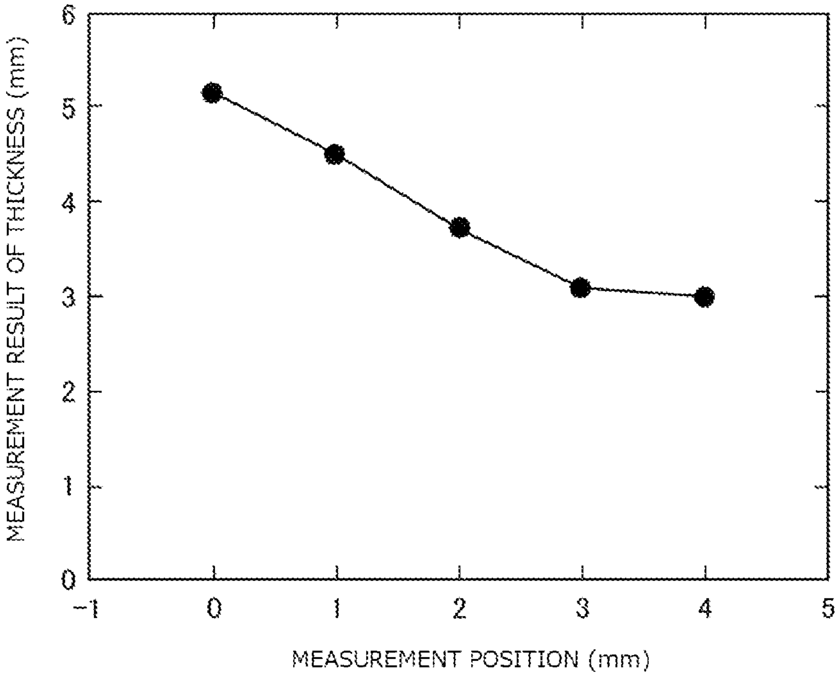
FIG. 8 is a graph showing a relationship between a measurement position of a thickness of the aluminum plate and a measurement result of the thickness.

Operations similar to those in Example 1 were performed except that the flat aluminum plate as the test subject in Example 1 was changed to an aluminum plate having a curved depression. In the aluminum plate having a curved depression, a thickness of a flat plate portion without the depression was 5 mm, and a thickness of a central portion of the depression was 3 mm. The relationship between the measurement position of the aluminum plate and the time change in the transmitted light intensity of the reflected light is shown in FIG. 7. As measurement positions of the aluminum plate corresponding to the irradiation position of the pulse laser, as shown in FIG. 7, one point in the vicinity of an outer periphery of the depression was set as a reference point, a distance from the reference point to the central portion of the depression was divided into five equal portions in a length direction of the aluminum plate, and positions of the divided five equal portions were irradiated with the pulse laser as indicated by arrows, and thicknesses of the aluminum plate corresponding to the irradiation positions of the pulse laser were evaluated. The distance from the reference point to the central portion of the depression in the length direction was 4 mm, and the distance between adjacent irradiation positions of the pulse laser was 1 mm. FIG. 8 shows the relationship between the measurement positions of thicknesses of the aluminum plate and measurement results of the thicknesses in the case of using the longitudinal wave. The measurement position of 0 mm in FIG. 8 is the reference point.

As shown in FIG. 8, a peak position of the transmitted light intensity fluctuates corresponding to the measurement position of the thickness of the aluminum plate, and as a result, it was possible to grasp the shape of the depression by confirming fluctuation of the thickness of the aluminum plate at the measurement position of the depression.

The disclosure of Japanese Patent Application No. 2021-123643 filed on Jul. 28, 2021 is incorporated herein by reference in its entirety.

All documents, patent applications, and technical standards described in this specification are incorporated herein by reference to approximately the same extent as if each document, patent application, and technical standard were specifically and individually indicated to be incorporated by reference.

REFERENCE SIGNS LIST

1, 21, 31 First laser emission unit
2, 22, 32 Second laser emission unit
3A, 3B, 23A, 23B, 33A, 33B Beam splitter
4A, 4B, 24, 34B Mirror
5A to 5E Condenser lens

6A to 6C, 26, 36A, 36B Detector
7 Voltage application unit
8 Display unit
9 Control unit
10, 30 Liquid crystal element
11 Transparent substrate
12 Liquid crystal film
13 ITO transparent electrode
14 Alignment film
25, 35 Filter
27, 37A ¼ wave plate
28A, 28B, 38 ½ wave plate
34A Dichroic mirror
40, 50 Test subject
100, 200, 300 Laser inspection system

The invention claimed is:

1. A laser inspection system, comprising:
a first laser emission unit that generates ultrasonic vibration on a surface of a test subject by irradiating the test subject with a pulse oscillation laser;
a second laser emission unit that emits a continuous oscillation laser;
a first beam splitter that is irradiated with the pulse oscillation laser emitted from the first laser emission unit and the continuous oscillation laser emitted from the second laser emission unit and splits the continuous oscillation laser emitted from the second laser emission unit into irradiation light to be irradiated to the surface of the test subject and reference light;
a liquid crystal element that receives reflected light that is the irradiation light irradiated to the surface of the test subject and reflected from the test subject and the reference light, and causes the reflected light and the reference light to interfere with each other;
a detection unit that detects at least one of the irradiation light or the reference light emitted from the liquid crystal element; and
a second beam splitter that is positioned between the test subject and the liquid crystal element, reflects the irradiation light to be split by the first beam splitter toward the test subject, and transmits the reflected light to be reflected by the test subject toward the liquid crystal element; wherein the liquid crystal element includes a liquid crystal film formed by a flexoelectric liquid crystal composition; and a pair of transparent substrates sandwiching the liquid crystal film, and
wherein the flexoelectric liquid crystal composition exhibits photoconductivity, and contains at least one kind of smectic liquid crystal compound; a chiral dopant; and a charge scavenger,
wherein a content of the chiral dopant is 0.1 parts by mass to 5 parts by mass with respect to 100 parts by mass of a total amount of the smectic liquid crystal compound.

2. A method of analyzing a test subject for analyzing a property of the test subject using the laser inspection system according to claim 1, the method comprising analyzing a property of the test subject on a basis of a change in intensity of light detected by the detection unit due to interference between the reflected light that is the irradiation light irradiated to a surface of the test subject where ultrasonic vibration is generated and reflected from the test subject and the reference light in the liquid crystal element.

3. The laser inspection system according to claim 1, wherein the chiral dopant contains a photoconductive chiral dopant.

4. The laser inspection system according to claim 3, wherein the photoconductive chiral dopant contains at least one of a compound represented by a general formula (1) below or a compound represented by a general formula (2) below:

(1)

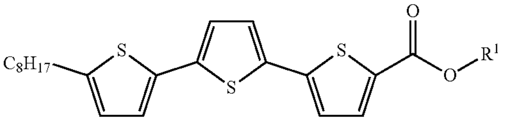

(2)

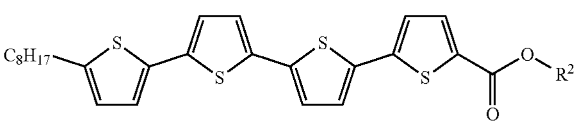

wherein in the general formula (1) and the general formula (2) each of $R^1$ and $R^2$ is independently a hydrocarbon group having an asymmetric carbon.

5. The laser inspection system according to claim 4, wherein in the general formula (1) and the general formula (2), $R^1$ and $R^2$ are a 2-methylbutyl group.

6. The laser inspection system according to claim 5, wherein the liquid crystal film has a thickness of 5 μm to 15 μm.

7. The laser inspection system according to claim 4, wherein the liquid crystal film has a thickness of 5 μm to 15 μm.

8. The laser inspection system according to claim 3, wherein the liquid crystal film has a thickness of 5 μm to 15 μm.

9. The laser inspection system according to claim 1, wherein the smectic liquid crystal compound contains a liquid crystal compound exhibiting a smectic C phase.

10. The laser inspection system according to claim 9, wherein the liquid crystal film has a thickness of 5 μm to 15 μm.

11. A laser inspection system, comprising:
a first laser emission unit that generates ultrasonic vibration on a surface of a test subject by irradiating the test subject with a pulse oscillation laser;
a second laser emission unit that emits a continuous oscillation laser;
a first beam splitter that is irradiated with the pulse oscillation laser emitted from the first laser emission unit and the continuous oscillation laser emitted from the second laser emission unit and splits the continuous oscillation laser emitted from the second laser emission unit into irradiation light to be irradiated to the surface of the test subject and reference light;
a liquid crystal element that receives reflected light that is the irradiation light irradiated to the surface of the test subject and reflected from the test subject and the reference light, and causes the reflected light and the reference light to interfere with each other; and
a detection unit that detects at least one of the irradiation light or the reference light emitted from the liquid crystal element; and
a second beam splitter that is positioned between the test subject and the liquid crystal element, reflects the irradiation light to be split by the first beam splitter toward the test subject, and transmits the reflected light to be reflected by the test subject toward the liquid crystal element;

wherein the liquid crystal element includes a liquid crystal film formed by a ferroelectric liquid crystal composition and a pair of transparent substrates sandwiching the liquid crystal film.

12. A method of analyzing a test subject for analyzing a property of the test subject using the laser inspection system according to claim 11, the method comprising analyzing a property of the test subject on a basis of a change in intensity of light detected by the detection unit due to interference between the reflected light that is the irradiation light irradiated to a surface of the test subject where ultrasonic vibration is generated and reflected from the test subject and the reference light in the liquid crystal element.

* * * * *